United States Patent [19]

Nelson

[11] 4,291,635

[45] Sep. 29, 1981

[54] APPARATUS FOR FEEDING FLUIDIZED BED INCINERATOR, AND METHOD OF AUTOGENIC OPERATION OF SAME

[75] Inventor: James F. Nelson, Houston, Tex.

[73] Assignee: The Quaker Oats Company, Chicago, Ill.

[21] Appl. No.: 67,604

[22] Filed: Aug. 20, 1979

[51] Int. Cl.³ .............................................. F23G 5/00
[52] U.S. Cl. .................................. 110/245; 110/263; 110/346; 110/347; 431/7; 431/170
[58] Field of Search ............... 110/245, 263, 346, 347, 110/104 R; 122/4 D; 431/7, 170

[56] References Cited

U.S. PATENT DOCUMENTS

| | | | |
|---|---|---|---|
| 3,319,586 | 5/1967 | Albertson et al. | 110/346 X |
| 3,605,655 | 9/1971 | Warshawsky et al. | 110/245 X |
| 3,763,830 | 10/1973 | Robison et al. | 122/4 D |
| 3,897,739 | 8/1975 | Goldbach | 110/245 X |
| 4,017,253 | 4/1977 | Wielang et al. | 431/170 X |
| 4,184,456 | 1/1980 | Taylor et al. | 431/170 X |

Primary Examiner—Edward G. Favors
Attorney, Agent, or Firm—Karen E. Ayd

[57] ABSTRACT

This invention relates to an improved method and apparatus for continuous autogenic incineration of high-moisture easily friable combustible agglomerates in a fluidized bed. The improvement comprises introducing the waste materials into the bed in a "tube" of air provided by supplemental air means which surrounds the in-bed feed means.

13 Claims, 7 Drawing Figures

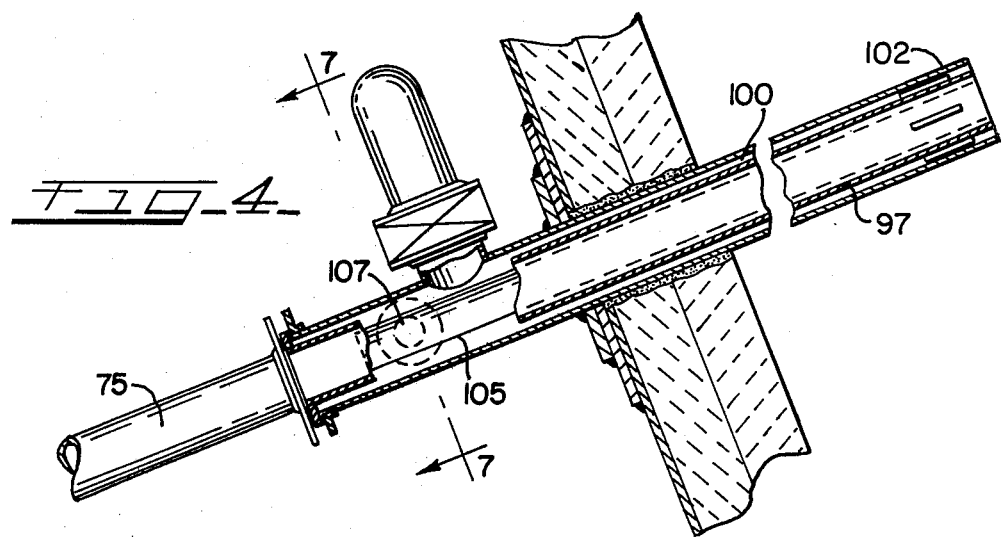
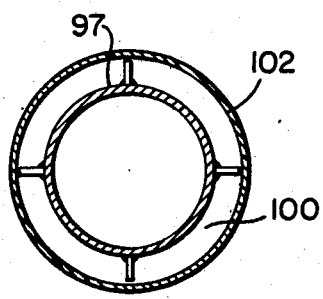
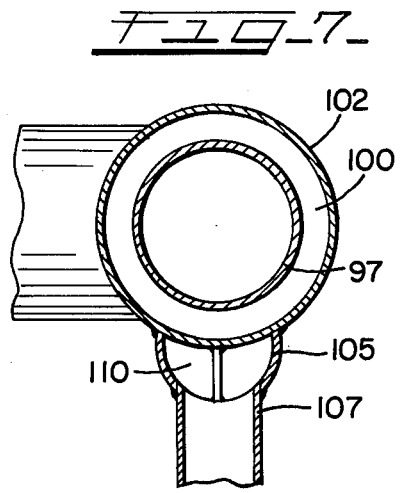
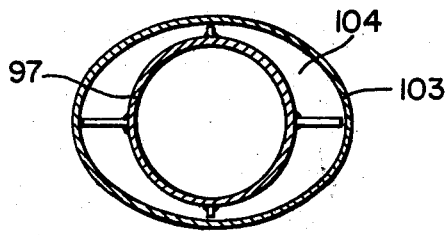

APPARATUS FOR FEEDING FLUIDIZED BED INCINERATOR, AND METHOD OF AUTOGENIC OPERATION OF SAME

BACKGROUND OF THE INVENTION

In fluidized bed incineration processes the combustion occurs in a bed of particulate material (generally sand) heated in a refractory-lined steel vessel. The bed of inert particulate material is supported on a perforated gas distribution plate mounted within the vessel and dividing the vessel into two chambers: the windbox below the plate and the reaction chamber above the plate. The bed is "fluidized" by air passing from the slightly elevated pressure windbox below the plate upwardly through the perforated plate and through the bed at a rate which is a function of the pressure differentials, e.g. bed depth controlled rate.

In a highly desirable mode of operation in large-scale incinerators, when the bed is at ignition temperature the constant feed of combustible waste products to be burned within the bed is at a sufficiently high rate to exclusively fuel the incinerator in autogenic operation (self-sustained burning of the wastes). For the most efficient operation this burning should occur within the bed of granular materials and not in the space of the reactor which is situated above the bed ("freeboard"). In reality however large-scale fluidized bed incineration of waste materials which have high moisture content is fraught with problems due to the requirement that the moisture be vaporized with the resulting cooling effect. Fluidized bed combustion of high moisture feeds typically results in less than complete combustion in the bed, with a substantial proportion of the combustion being "afterburning" or burning which occurs in the freeboard space above the bed. Under such conditions, the temperature in the bed is less than ideal and the temperature in the freeboard is higher than the ideal. Further problems result from the steam which is generated in the combustion of high moisture materials. The steam tends to smother that combustion which does occur within the bed. In exemplary operation, the freeboard should be maintained between 1600°–1800° F. and the fluidized bed should be maintained between 1400°–1600° F. If the temperature in the bed falls much below 1300° F. smoking will begin, indicating a critical condition during which time there is a potential risk of explosion.

In the past this problem of poor combustion in the bed could only be solved by the introduction of an additional fuel (i.e. natural gas or oil) into the bed to supplement the generation of heat and thus significantly raise the bed temperature and consequently lower the temperature in the freeboard space. This need for additional fuel sharply impairs the economics of processes involving fluidized bed incineration of wastes to produce heat derived energy.

Until recently the large-scale commercial fluidized bed incinerators employed most frequently in waste disposal provided for the feeding of the waste material above the fluidized bed through a portal in the side or top of the reactor vessel. In these "top-feed" incinerators, the waste material falls freely through the freeboard or down the sidewalls of the reactor and onto the bed surface. Even with the flow of fluidizing air through the bed, with the resulting circulation and agitation in the bed, this method of feeding still leads to poor distribution of the feed within the bed itself and therefore to less heat generation in the bed. More burning occurs in the upper layer of the bed and in the freeboard space above the bed. It was extremely difficult, if not impossible, to maintain autogenic operation with such systems.

In order to partially alleviate this problem more recent fluidized bed reactor designs have provided for feeding directly into the bed itself. In these reactors the vessel is provided with a chute directed into the bed or a feed portal located lower on the reactor sidewall and adjacent to the bed itself, to permit "in-bed" feeding. The latter method has not been found to solve the poor distribution and poor "in-bed" burning problems in large-scale commercial incinerators. Some smaller incinerator designs have included a stirring apparatus to provide more turbulence and better feed distribution throughout the bed. However, in large-scale operations such stirring has generally not been regarded to be feasible.

Thus, even with the use of in-bed feeding techniques heretofore available, the relatively low extent of burning in the bed and the subsequent greater extent of combustion or afterburning which occurs in the freeboard space above the bed has remained a significant problem, creating a barrier against autogenic operation in the use of fluidized bed incinerators for burning of high moisture wastes.

U.S. Pat. No. 4,036,153 issued to Robin Nauta specifically relates to a "topfeed" incinerator and is claimed to enhance the in-bed distribution of the feed and combustion at or near the top of the bed. The Nauta structure provides the reaction chamber with an auxiliary air source which introduces air at a point directly above the fluidized bed through a pipe which is concentric with a respective downwardly directed feed pipe and is spaced therefrom in surrounding relation to define an annular air passage way. The patent alleges that the air which passes into the reaction chamber through this passage way provides an air shield around the feed pipe and forces material floating on top of the fluidized bed back into the bed. The text of the patent indicates that the relatively dry feed material issues from screw feeders into the downwardly directed feed pipe which ends directly above the bed and the feed falls freely through the pipe and onto the surface of the fluidized bed. The combustion within the bed is supported by the fluidizing air from the windbox below the bed. Column 3, line 19, of the Nauta patent, states that some combustible gasses and fine solids do escape from the bed and that the auxiliary air supports combustion of these escaping materials largely in the region close to, but after they have escaped from the bed. It also states that this combustion takes place in the freeboard but close to the bed. The Nauta patent makes no representations that the Nauta apparatus is capable of autogenic operation, particularly with medium or high moisture level infeeds. It is manifest that the apparatus shown in the Nauta patent is merely a schematic drawing containing absolutely none of the auxiliary accouterments such as auxiliary fuel injection means. The schematic drawings appear to be limited to components germane to the Nauta infeed device. Nonetheless, other than general discussion in the introductory paragraphs there is no specific reference to means for injecting fuel, and raising the temperature of the bed to operating temperature, or means for maintaining ignition temperatures during operation of the bed, even with relatively dry feed material.

Another patent, namely U.S. Pat. No. 3,863,577 which was issued to Andrew Steever et al, described auxiliary air injection means mounted in the reactor wall and disposed in a horizontal plane a short distance above the top strata of the fluidized bed to establish and maintain a combustion zone of high turbulence in the freeboard region which is directly adjacent to and merging with the top strata of the bed. The Steever patent in FIG. 6 and at Col. 8, line 31 shows as one of its alternative embodiments an in-bed feeding system in which sewage sludge is screw-fed directly into the bed. It specifically refers to supply means 62 for the injection of supplemental fuel into the bed (Col. 8, lines 37-40). The Steever's patent also specifically admits, (Col. 8, lines 44-48) that, "These sludges furthermore require the continuous injection of supplemental fuel into the bed in order to maintain the combustion." Nowhere in the Steever patent is there any representation that the Steever's patented apparatus can achieve autogenic operation, i.e. complete elimination of the supplemental fuel.

Both of the above-mentioned patents disclosed auxiliary air sources which provide for air turbulence above and adjacent to the fluidized bed itself. These methods provide for burning in the area directly above the top surface of the bed. Neither patent teaches nor suggests that its respective apparatus can be maintained in autogenic operation.

On the other hand, it is an object of this invention to provide a method and apparatus for the incineration of high moisture (50-70% water) easily friable combustible agglomerates in a fluidized bed on a continuous autogenic basis.

It is an object of this invention to provide for more complete burning of the combustibles within the bed, thus enhancing the heating of the bed itself to the extent that it will sustain autogenic operation and thus reduce the "afterburning" which occurs in the freeboard above the bed.

It is another object to provide for extremely high levels of in-bed combustion in the fluidized bed incinerator, to such an extent that high moisture feeds are continuously dried as well as burned to a great extent within the bed.

It is a further object of this invention to provide autogenic operating conditions, in which the bed is maintained at a temperature of approximately 1500°-1600° F. for the optimum operation without addition of supplemental fuel.

It is a still further object of the present invention to provide an apparatus and method for incinerating high moisture wastes in a fluidized bed system in which the autogenic operating temperature is controllably adjusted upwardly or downwardly by increasing or decreasing the rate of addition of supplemental air into the bed.

Further, it is an object of this invention to provide for combustion of the high moisture materials without the addition of other heat source materials such as oil and natural gas.

These and other objects of this invention are attained by the method and apparatus of the present invention, wherein easily friable combustible agglomerates are fed into the bed in a first high velocity air stream through feed means including a feed tube which is surrounded by a supplemental air tube at least to the point of discharge within the bed. Thus, the injection of the high moisture combustible feed occurs within a second high velocity air stream which surrounds the first stream containing the injected combustibles, at least momentarily after their discharge from the feed tube.

I have discovered that by feeding the combustibles to be burned into the incineration bed in a first high velocity air stream which is surrounded by a second high velocity air stream, in accordance with this invention, a better distribution is provided and thus more rapid and complete burning of the combustibles occurs in an autogenic operation, even with high moisture feed, e.g. 50-80% water.

BRIEF DISCRIPTION OF THE DRAWINGS

FIG. 4 is a partially cut-away cross-sectional fragmentary view taken along the line 3—3 of FIG. 1, showing an alternate embodiment, namely one using a single feed with surrounding supplemental air means.

FIG. 5 is a cross-sectional view taken along line 5—5 of FIG. 2 of one embodiment of the feed tubes with surrounding supplemental air tube.

FIG. 6 is a cross-sectional view of an alternative embodiment for the feed tube and surrounding supplemental air tube also taken along line 5—5 on FIG. 2.

FIG. 7 is a cross-sectional view of a further modification and embodiment of the feed and surrounding supplemental air tubes which also includes a tertiary air tube, and is taken along the line 7—7 of FIG. 4.

DETAILED DESCRIPTION

Generally speaking, the incinerator of the present invention includes an improved feed means in which the feed of high moisture easily friable combustible agglomerates to be burned is surrounded by high velocity air at the point of injection into the bed. The material to be burned in the fluidized bed incinerators of the present invention are combustibles which can have a moisture content as high as approximately 50-75% moisture and which are agglomerates which are easily friable and are of such sizes and shapes as to be capable of being conveyed in a high velocity air stream into the bed. Many filter coke industrial wastes and active sewage sludge solids are illustrative of materials which can be burned in the incinerator and method of this invention.

Also, in preferred embodiments the feed means is situated substantially halfway up the height of the fluidized bed such that the feed is injected into the lateral middle third of the bed.

Figure 1:
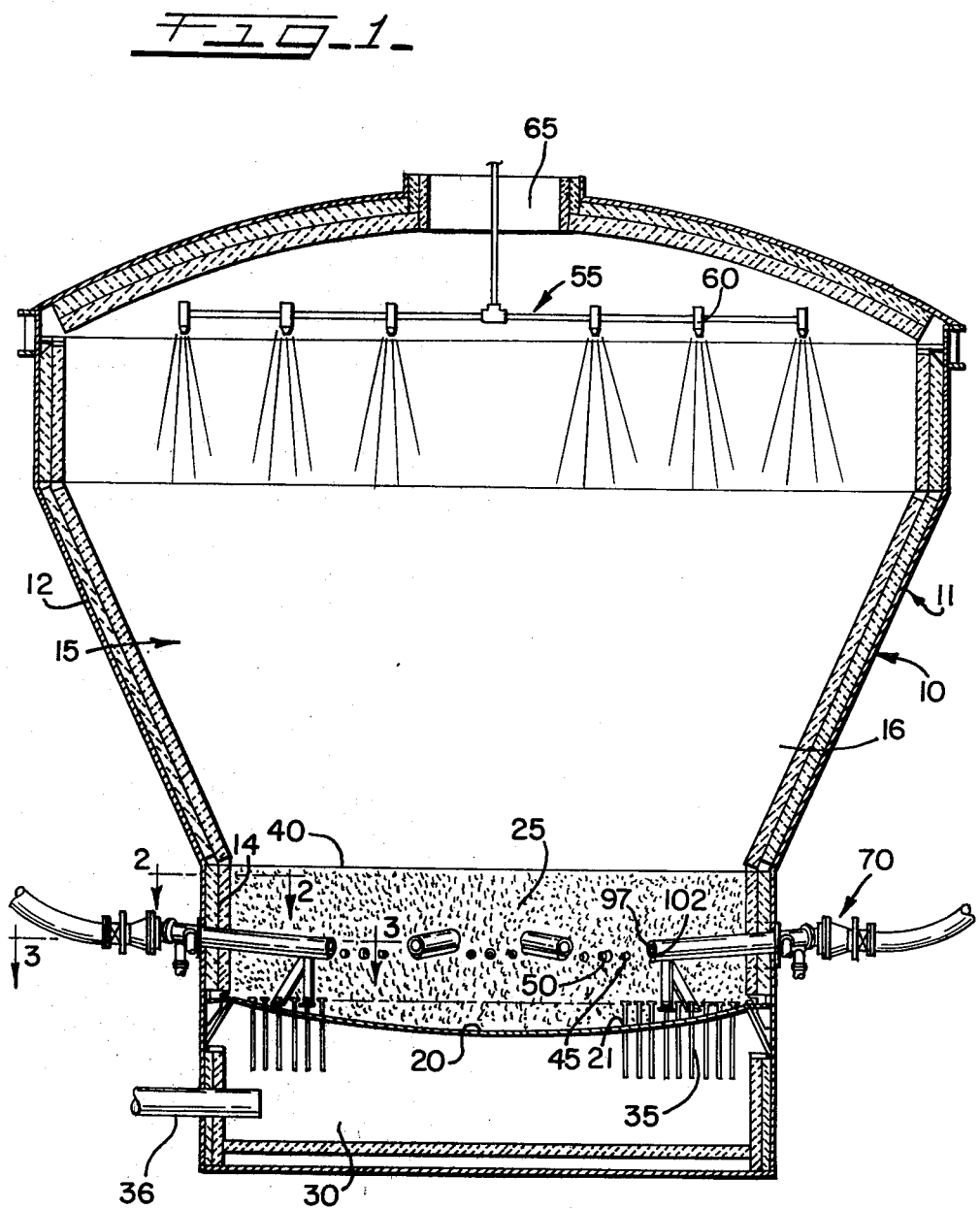
FIG. 1 is a vertical, cross-sectional elevational view of a fluidized bed incinerator in accordance with the present invention.

The fluidized bed incinerator unit 10 illustrated in FIG. 1 is a refractory-lined steel housing 11 of the type commonly used to incinerate waste materials. A gas distribution plate is 20 mounted in and divides the housing into two major compartments: the windbox 30 below the gas distribution plate 20 and the reactor chamber 15 above, and supports the fluidized bed 25 of particulate material.

The gas distribution plate 20 is provided with a plurality of orifices 21 which are equipped with "T" shaped tuyeres 35 which permit air to flow upwardly from the windbox 30 into the bed 25 of particulate solids but prevent the particulate material from falling into the windbox 30 especially when the unit is not in operation. For clarity only a few of the tuyeres 35 are shown, but it is understood that these are uniformly spaced across the entirety of the horizontal extent of plate 20. It is also noted that all tuyeres 35 are of identical length and end at the same horizontal level within bed 25 to provide for uniform flow through all the tuyeres 35. Windbox 30 is pressurized by conventional compressor means (not shown) through duct 36, to a sufficient extent to fluidize bed 25. For a given quantity of particulate material, the bed 25 when fluidized will obtain a height no higher than the line indicated by the numeral 40. The height 40 of the fluidized bed 25 is generally the height of the cylindrical section of the lower sidewall 14 of the housing. Above the height 40 of the fluidized bed 25 the sidewall of the housing 11 begins to flare out to form the generally conical upper sidewall 12. The area above the actual top of bed 25 is referred to as freeboard 16. Of course, less particulate material can be used if desired.

In addition, the incinerator unit 10 is equipped with gas nozzles 45 and oil nozzles 50 which are located in bed 25 and provide supplementary fuel for preheating the bed 25 to ignition temperature during start-up operations. A water spray unit 55 within the freeboard space 15 is equipped with water nozzles 60 to dispense quench water to rapidly cool the gasses in freeboard 16 in the event that the interior temperature of the incinerator should reach excessively high temperature conditions. This is provided to protect downstream heat exchange equipment. In its most efficient operation, the exhaust port 65 positioned in the upper portion of the incinerator 10 permits exit of the heated gasses to a conventional boiler (not shown) for example to convert water in the boiler to steam, thus providing reclaimed energy.

The general combination of feed means with supplemental surrounding air means is generally indicated by the numeral 70, and extends through the cylindrical section of lower sidewall 14 of the incinerator 10 and extends horizontally into the fluidized bed 25. Combination 70 comprises the feed tube 97, and surrounding supplementary air tube 102.

Various embodiments of the feed and surrounding supplemental air means combination 70 are shown in greater detail in FIGS. 2 through 7.

Figure 2:
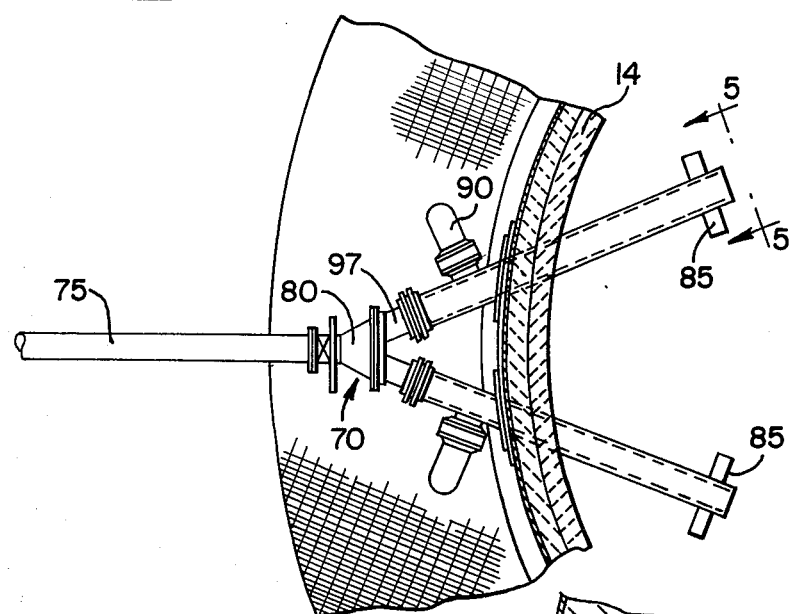
FIG. 2 is an enlarged fragmentary cross-sectional view taken along the line 2—2 in FIG. 1, show a bifurcated feed with surrounding supplemental air means.
Figure 3:
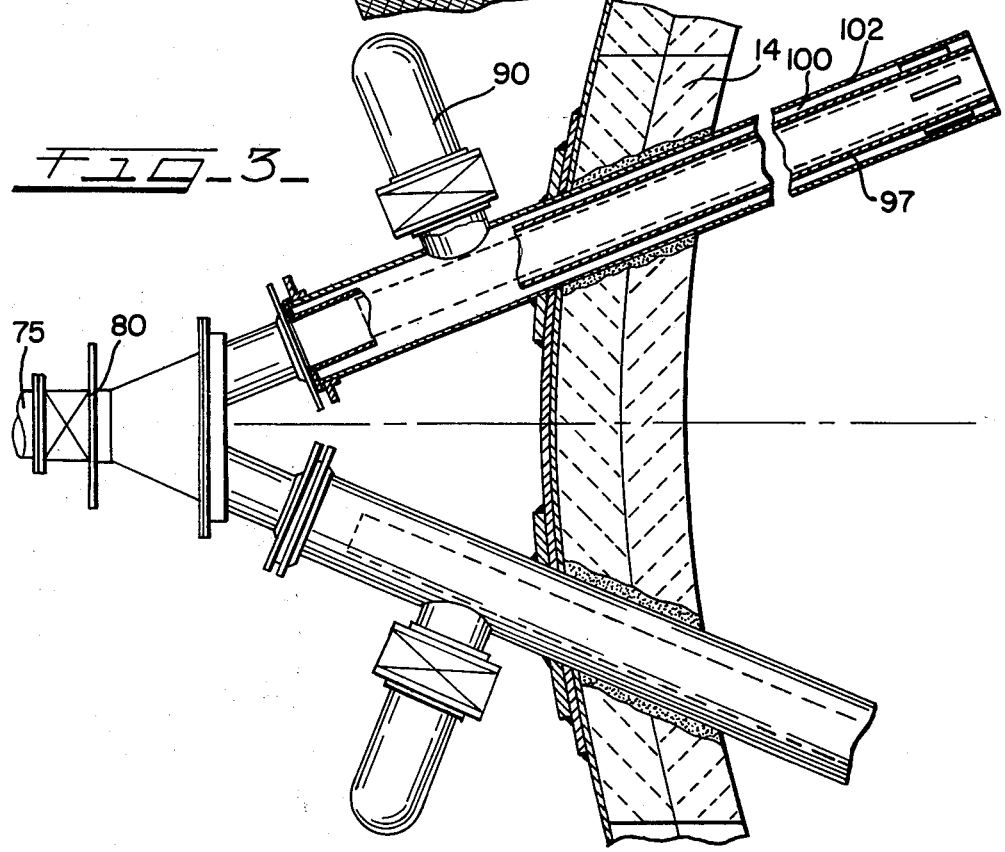
FIG. 3 is a further enlarged partially cut-away cross-sectional fragmentary view taken along the line 3—3 in FIG. 1, showing the bifurcated feed with surrounding supplemental air means as illustrated in FIG. 2.

FIGS. 2 and 3 illustrate an embodiment in which the feed means with supplemental surrounding air means combination 70 is bifurcated to provide greater dispersement of feed. The air is supplied to the supplemental surrounding air passageway 100 by supplemental air line 90. The air supplied by supplemental air line 90 is provided by a bleed off of the air provided by a compressor (not shown) to the windbox 30. The supplemental surrounding air passageway 100 is created by the placement of supplemental air tubes 102 in surrounding relation to the feed tubes 97 which are supplied with the combustible feed carried in a high velocity air stream through feed line 75. The high velocity air stream which conveys the feed is supplied by a second compressor (not shown). The feed manifold body 80 unites the bifurcated feed tubes 97 and the feed line 75 outside the conical lower sidewall 14. The feed tubes 97 and supplemental air tubes 102 which surround the feed tubes 97 are supported at the discharge end by support legs 85 which rest on the gas distribution plate 20.

FIG. 4 illustrates a preferred embodiment of the present invention in which the feed line 75 is not bifurcated but instead enters the fluidized bed 25 as a single feed tube 97 with single supplemental air tube 102 disposed in surrounding relation to the feed tube 97. An embodiment of the present invention is illustrated which provides optional tertiary air tube 105 which is disposed below and substantially parallel to the feed tube 97 with the surrounding air tube 102. This will be further discussed in connection with FIG. 7.

In FIG. 5 the feed tube 97 is concentric with the supplemental air tube 102 thus creating an annular supplemental air passageway 100. The alternative embodiment illustrated in FIG. 6 shows an elliptical supplemental air tube 103 surrounding a circular feed tube 97 to provide passageway 104.

FIG. 7 illustrates an embodiment in which a tertiary air line 107 supplies air to a tertiary air tubes 105 which are disposed below the supplemental air tube 102 thus creating tertiary air passageway 110. The tertiary air is pressurized by a separate compressor (not shown because conventional), and enters into the bed conjointly with the feed and supplemental air streams and provides additional air for combustion and turbulence.

In operating the incinerator of the present invention, the start-up procedure involves initially, bringing bed 25 to ignition temperature by burning natural gas supplied through gas nozzle 45 until the bed 25 reaches a temperature of about 1000° F. and then replacing the flow of gas with oil supplied through oil nozzle 50 until the bed 25 reaches the autogenic ignition temperature. At this temperature the oil will be combusted to provide additional heat. The oil flow is stopped when the bed reaches autogenic operation temperature, e.g. 1700° F. Autogenic ignition temperature will depend on the amount of moisture, the heat of combustion of the feed, and other variables, and, for a given feed is readily determined by trial, e.g. by momentarily discontinuing the supplementary fuel and closely observing whether temperature remains constant. Thus the feed in-put can begin before autogenic ignition temperatures are reached, but should not begin until temperatures of at least about 1300° F. are reached in order to minimize smoking and the danger of explosive combustion which, of course, is always present under severe smoking conditions.

The fluidizing air supplied to the windbox chamber 30 from a compressor (not shown) flows upwardly through the "T"-shaped tuyeres 35 into the bed 25 at a flow rate sufficient to fluidize the bed 25. As the feed stream enters the bed 25 it is surrounded by the supplemental air which exits from the supplemental air passageway 100, 104. Optionally, additional air can be introduced from the tertiary feed air passageway 110.

As the combustibles burn, the heated air combustion products, steam and ash wastes, rise through the freeboard 16 and leave the incinerator through exhaust port 65. Not all the combustion products are completely burned, however, and some additional burning may take place in freeboard 16. If, for any reason, temperatures of gasses leaving freeboard 16 through port 65 reach levels at which the downstream equipment is endangered, e.g. temperatures in excess of 2000° F., water is sprayed into freeboard 16 in a sufficient quantity to reduce the freeboard temperatures to smooth safe operating range, e.g. 1600°–1850° F. The ash is separated by a cyclone separator (not shown) and the hot gasses may be used to heat water in a boiler creating steam for use as an energy source.

EXAMPLE

In accordance with the method of the present invention, high-moisture rice hull furfural residue containing approximately 55 percent moisture was burned in a large fluidized bed incinerator on a continuous autogenic basis in a bed of sand without addition of supplemental fuels.

In the start-up operation, natural gas was burned to raise the temperature of the bed 25 to ignition temperature (about 1200° F.) and oil was then fired directly into the bed 25 to continue raising the temperature of the bed 25 to approximately 1400° to 1600° F. (The oil, which is injected into the bed through 12 entry ports 50 situated around the circumference of the incinerator unit 10, will burn in the bed 25 without the addition of supplemental air.)

Once the bed 25 was at ignition temperature, the residue was charged through a bifurcated feed line 75 and injected, through the dual feed tubes 97 each surrounded by its respective supplementary air tubes 102,103 horizontally into the bed 25 at a level 40–45 inches above the bottom of the fluidized bed (approximately the horizontal middle third of the 90 inch deep bed). Each of the two feed tubes 97 extended into the bed 25 to a point of discharge approximately 6 feet from the lower sidewall 14 of the incinerator 10.

Approximately 7,000 cubic feet per minute of air was charged through the feed tubes 97 at a feed rate of 48 tones of wet 55 percent water infeed material per hour. At this feed rate approximately 26 tons of water per hour was fed into the incinerator bed 25. The tip velocity at the discharge point in the bed was approximately 200 feet per second.

An approximately equal volume of air (i.e. 7,000 cubic feet per minute) was introduced through the surrounding supplementary air tubes 102, 103. The supplemental surrounding air streams were supplied through the supplemental air line 90 as a bleed-off from the windbox 30. A compressor (not shown because conventional) pressurizes the windbox 30 located below the air distribution plate 20 and the pressure enables the flow of air from the windbox 30 through the bed as well as from the windbox into the bed 25 by way of supplemental air tubes 102, 103. The high velocity air stream which conveys the feed through tubes 97 was provided by a separate compressor (not shown because conventional).

As soon as the solids feed input was established, all gas and oil injection was terminated, and the incinerator was observed to operate autogenically in a smooth readily controlled fashion. With respect to pressure through the incinerator 10, during autogenic operation, approximately 6 psig was maintained in the windbox beneath the bed, and approximately 1½ lbs. pressure drop occurred across the air distribution plate. Approximately 2½ lbs. pressure drop occurred across the bed and 1½ psig was observed in the freeboard.

The high moisture furfural residue waste solids were continuously charged into the heated bed 25 in the high velocity conveying air stream surrounded by a supplemental stream of air. Thus the residue was introduced into the bed as highly dispersed small aggregrate particles. Under one set of test conditions, supplemental surrounding air stream was supplied to the bed at the rate indicated above in this example, the bed maintained itself at optimum autogenic operating temperatures of about 1400°–1600° F. and the freeboard temperature was observed to remain in the range of 1600°–1850° F.

In a separate test in which the supplemental surrounding air was then cut off, the temperature of the freeboard 15 rose to above 1750°–1800° F. and the bed temperature dropped to below 1300° F., the critical level at which smoking began, creating potentially explosive conditions. Water was injected into the freeboard to squelch the temperatures of the exit gases leaving the freeboard. The exit gas temperatures are not permitted to exceed 2000° F. at discharge from the incinerator in order to protect equipment downstream from the incinerator. In a third set of test conditions all the control variables remained the same, except that the amount of the air conveying the feed was increased but no temperature change was observed within the bed or the freeboard.

Under a fourth set of test conditions in which all the control variables remained the same except that the supplemental surrounding air was once again turned on, and supplemental air was added at the rate set forth initially in this example the freeboard temperature dropped to 1600°–1850° F. and the bed temperature rose to 1400°–1600° F. The bed and freeboard thus once again achieved optimum autogenic operating conditions, and the incinerator 10 continued to operate in autogenic mode.

After passing from the freeboard of the incinerator, the exit gases were passed through a boiler in which the temperature of the gases was dropped from approximately 1800° F. to 450°–490° F. The cooled gases (with fly ash entrained) were passed into a scrubber which dropped the gas stream temperature to about 165° F. The ash was separated in a cyclone separator and the phosphoric acid, $SO_2$, sulfuric acid catalyst, etc. present in the feed of rice hull furfural residue, which were converted during the incineration to gaseous products, were scrubbed out in the water. The sulphur dioxide, phosphorus oxides, etc. were precipitated out of the scrub liquor by precipitation with calcium hydroxide (lime) and then removed.

Thus it can be readily observed that an efficient fluidized bed incinerator can be economically employed to convert high moisture wastes into a readily available energy source, provided that the burning is autogenic, and thus no additional energy source material is needed to sustain the burning.

Thus, the difficult problems of the lack of complete burning in the bed 25 and the consequent potentially dangerous conditions encountered when burning high moisture wastes in extremely large incinerators are alleviated by the apparatus and method of the present invention.

I claim:

1. In a fluidized bed incinerator for combusting readily friable agglomerates, said incinerator being of the type having a gas impervious reactor housing, a generally horizontally disposed air distribution plate mounted in and dividing said housing into a windbox below the plate and a reaction chamber above the plate, a bed of inert particulate solids supported on the air distribution plate, air passage means in said plate for directing air flow upwardly through said plate, and for preventing the downward flow of said particulate solids through said plate, said means comprising a plurality of openings distributed across the plate, air pressurizing means for providing pressurized air in said windbox, and to fluidize the bed, and a feed means extending horizontally into the bed for introducing feed directly into an interior portion of the bed, the improvement comprising:

the combination of said feed means and supplemental air means in which said feed means includes a generally horizontally disposed first tube and means for passing said agglomerates through said tube in a high velocity air stream, said supplemental air means comprising a second tube disposed in surrounding relation to the first tube to the point of discharge within the bed and means for passing a high velocity air stream through said second tube to introduce a high velocity air-feed stream at the point of discharge into the bed.

2. The fluidized bed incinerator of claim 1 wherein the feed means discharges in a horizontal zone constituting the middle third of the bed whereby the feed is introduced into the interior portion of the bed, in said zone.

3. The fluidized bed incinerator of claim 1 wherein the first tube is concentrically disposed within the second tube.

4. The fluidized bed incinerator of claim 1 wherein said first tube is bifurcated having dual divergent discharge ends, and each of said divergent ends is surrounded by respective second tubes.

5. The fluidized bed incinerator of claim 1 which also includes tertiary air means comprising a generally horizontal third tube disposed below and substantially parallel with the combination of first and second tubes and means for passing a high velocity air stream through said third tube, wherein said third tube discharges an air stream into the interior of the bed at a position directly below the air stream introduced by said second tube.

6. A method for incinerating easily friable high moisture combustible agglomerates in a fluidized bed of inert particulate solids said method comprising:

feeding said agglomerates into the bed in a first high velocity air stream and surrounding at the point of discharge within the bed said first air stream with second supplemental air stream discharging said first and second streams within the bed.

7. The method of claim 6 in which the agglomerates are fed into the bed in the horizontal middle third thereof.

8. In a fluidized bed incinerator for combusting readily friable agglomerates said incinerator being of the type having a gas impervious reactor housing, a generally horizontally disposed air distribution plate mounted in and dividing said housing into a windbox below the plate and a reaction chamber above the plate, a bed of inert particulate solids supported on the air distribution plate, air passage means in said plate for directing air flow upwardly through said plate, and for preventing the downward flow of said particulate solids through said plate, said means comprising a plurality of openings distributed across the plate, air pressurizing means for providing pressurized air in said windbox, and to fluidize the bed, and feed means extending horizontally into the bed for introducing feed directly into an interior portion of the bed, the improvement comprising:

the combination of said feed means and supplemental air means in which said feed means includes a generally horizontally disposed bifurcated first tube and means for passing said agglomerates through said tube in a high velocity air stream, said supplemental air means comprising a bifurcated second tube disposed in surrounding relation to the first tube and means for passing a high velocity air stream through said second tube to introduce a high velocity air-feed stream into the bed, wherein said bifurcated first tube has dual divergent discharge ends, and wherein each of said divergent ends is surrounded by respective divergent ends of said second tube.

9. In a fluidized bed incinerator for combusting readily friable agglomerates said incinerator being of the type having a gas impervious reactor housing, a generally horizontally disposed air distribution plate mounted in and dividing said housing into a windbox below the plate and a reaction chamber above the plate, a bed of inert particulate solids supported on the air distribution plate, air passage means in said plate for directing air flow upwardly through said plate, and for preventing the downward flow of said particulate solids through said plate, said means comprising a plurality of openings distributed across the plate, air pressurizing means for providing pressurized air in said windbox, and to fluidize the bed, and a feed means extending horizontally into the bed for introducing feed directly into an interior portion of the bed, the improvement comprising:

the combination of said feed means, supplemental air means and a tertiary air means in which said feed means includes a generally horizontally disposed first tube and means for passing said agglomerates through said tube in a high velocity air stream, said supplemental air means comprising a second tube disposed in surrounding relation to the first tube and means for passing a high velocity air stream through said second tube to introduce a high velocity air-feed stream into the bed, and said tertiary air means comprising a generally horizontal third tube disposed below and substantially parallel with the combination of first and second tubes and means for passing a high velocity air stream through said third tube, wherein said third tube discharges an air stream into the interior of the bed at a position directly below the air stream introduced by said second tube.

10. In a fluidized bed incinerator for combusting readily friable agglomerates, said incinerator being of a type having a gas impervious reactor housing, a generally horizontally disposed air distribution plate mounted in and dividing said housing into a windbox below the plate and a reaction chamber above the plate, a bed of inert particular solids supported on an air distribution plate, air passage means in said plate for directing an air flow upwardly through said plate and for preventing the downward flow of said particulate solids through said plate, said means comprising a plurality of openings distributed across the plate, air pressurizing means in said windbox, and to fluidize the bed, and a feed means extending horizontally into the bed for introducing feed directly into the interior portion of the bed, the improvement comprising:

the combination of said feed means and supplemental air means wherein said feed means includes a generally horizontally disposed first tube, and means for passing said agglomerates through said tube in a first air stream of sufficiently high velocity to force the agglomerates into the bed in a substantially straight line path at least momentarily after entering into the bed, and wherein said supplemental air means comprises a second tube disposed in surrounding relation to the first tube, and means for passing a second high velocity air stream therethrough, wherein the second air stream maintains straight line path at least momentarily after discharge into the bed, thereby surrounding the agglomerates entrained in the first air stream at least momentarily upon discharge in the bed.

11. An improved method for continuous autogenic operation of a fluidized bed incinerator to incinerate high moisture combustibles said method comprising preheating a bed of particulate matter to autogenic ignition temperature by burning oil and gas, and injecting a feed of high moisture combustibles into the preheated bed of particulate material, wherein the improvement in the method comprises:
injecting into the bed the high moisture combustibles entrained within a first high velocity air stream, and at least momentarily surrounding the first air stream having the combustibles entrained therein with a second high velocity air stream at the point of injection of the combustibles into the bed.

12. An improved method for the continuous autogenic incineration of high moisture combustibles in a fluidized bed incinerator, said method comprising preheating the fluidized bed of particulate material to an autogenic ignition temperature by burning oil and gas, and injecting into the preheated bed entrained in a first air stream a feed of high moisture combustibles, wherein the improvement comprises:
surrounding the first air stream having combustibles entrained therein with a second air stream and providing that both first and second air streams are of sufficiently high velocity to individually continue in a straight line trajectory at least momentarily upon entering the bed, thereby providing that the combustibles entrained in the first air stream are surrounded by the second separate air stream at the point of discharge into the bed.

13. A method for incinerating easily friable, high moisture combustible agglomerates in a fluidized bed of inert particulate solids said method comprising:
feeding said agglomerates into the bed in a first high velocity air stream, surrounding said first air stream with a second supplemental air stream, and discharging said first and second streams within the bed such that the streams continue to follow a straight line path into the bed at least momentarily after discharge.

* * * * *